(12) United States Patent
Seo et al.

(10) Patent No.: US 8,022,374 B2
(45) Date of Patent: Sep. 20, 2011

(54) HOLDER DEVICE FOR ANALYZING CHARACTERISTICS OF DOSIMETER

(75) Inventors: Tae Suk Seo, Seoul (KR); Jin Beom Chung, Seoul (KR); Jeong Woo Lee, Yongin (KR); Yon Lae Kim, Seoul (KR); Kyoung Sik Choi, Suwon (KR); Seoung Jong Oh, Seoul (KR); Jai Woong Yoon, Yongin (KR)

(73) Assignee: Catholic University Industry Academic Cooperation Foundation, Seoul (KR)

( * ) Notice: Subject to any disclaimer, the term of this patent is extended or adjusted under 35 U.S.C. 154(b) by 1014 days.

(21) Appl. No.: 11/775,881

(22) Filed: Jul. 11, 2007

(65) Prior Publication Data

US 2008/0049412 A1 Feb. 28, 2008

(30) Foreign Application Priority Data

Jul. 11, 2006 (KR) .................. 10-2006-0064924

(51) Int. Cl.
*H05K 5/00* (2006.01)
(52) U.S. Cl. .................. 250/484.5; 250/252.1
(58) Field of Classification Search .............. 250/252.1, 250/484.5
See application file for complete search history.

(56) References Cited

U.S. PATENT DOCUMENTS

| 4,772,796 | A | * | 9/1988 | Studer et al. ............... 250/485.1 |
| 5,302,351 | A | * | 4/1994 | Lueck ............................ 422/87 |
| 6,364,529 | B1 | * | 4/2002 | Dawson ....................... 378/207 |
| 6,398,710 | B1 | * | 6/2002 | Ishikawa et al. ................. 600/3 |
| 7,655,921 | B2 | * | 2/2010 | Fehrenbacher et al. . 250/390.03 |
| 2006/0027756 | A1 | * | 2/2006 | Thomson et al. ........ 250/370.07 |

OTHER PUBLICATIONS

JPO translation of JP 2006-047009.*

* cited by examiner

*Primary Examiner* — David Porta
*Assistant Examiner* — Djura Malevic
(74) *Attorney, Agent, or Firm* — The Nath Law Group (57) ABSTRACT

Provided is a holder device for analyzing characteristics of a dosimeter. In the holder device, the dosimeter is located in a desired direction on a radiation path along which radiation is irradiated from a radiation emitter, and a radiation absorbance characteristic is recognized according to a radiation dose absorbed by the dosimeter. The holder device includes: a dosimeter holder fixedly supporting the dosimeter; a body having a partial spherical portion with a specific curvature, and having a plurality of mounting holes containing the dosimeter holder; and a supporter supporting the body so that the dosimeter is located on the radiation path. Accordingly, in the holder device for analyzing characteristics of a dosimeter, one or more dosimeters can be disposed at a desired angle and position with respect to a radiation emitter, characteristics of the dosimeter can be accurately analyzed, and thus radiation treatment and treatment schedule can be effectively performed.

11 Claims, 12 Drawing Sheets

HOLDER DEVICE FOR ANALYZING CHARACTERISTICS OF DOSIMETER

CROSS-REFERENCE TO RELATED PATENT APPLICATION

This application claims the benefit of Republic of Korea Patent Application No. 10-2006-0064924, filed on Jul. 11, 2006, in the Korean Intellectual Property Office, the disclosure of which is incorporated herein in its entirety by reference.

BACKGROUND

1. Field of the Invention

The present invention relates to a holder device for analyzing characteristics of a dosimeter.

2. Description of the Related Art

In order to destroy cancer cells or to alleviate pains of cancer patients, therapeutic radiation used for medical purposes is aimed to a tumor of a cancer patient so as to prevent further propagation of a cancer cell.

Such a radiation treatment is used to avoid relapse of cancer when there is a high possibility that cancer cells are not entirely eliminated even after surgery. In addition, the radiation treatment is used when surgery is not available, or when surgery is less effective than the radiation treatment, or when patient can benefit by both surgery and radiation treatment. Furthermore, the radiation treatment is used to maximize anticancer effect after the patient receives an anticancer drug treatment.

The radiation treatment is carried out using an expensive medical device called a "linear accelerator". The linear accelerator can emit an X-ray and an electron ray and can regulate an output energy level. Further, the linear accelerator can provide a high dose rate. Therefore, at present, the linear accelerator is used as a standard device for radiation treatment.

What is the most important factor in the use of the linear accelerator during the radiation treatment is that the linear accelerator has to emit radiation with an optimal energy level. This is because a best therapeutic effect can be expected when the radiation is irradiated with optimal energy corresponding to the state, the size, or the depth of tumor.

Therefore, prior to using the linear accelerator, a precision examination has to be performed to check whether the linear accelerator normally operates, in particular, whether a radiation dose is properly regulated to emit radiation with suitable energy. For this, a variety of devices for measuring the radiation dose is used.

One example of the devices for measuring the radiation dose is a dosimeter which measures an absorbed radiation dose or an exposure radiation dose to know how much the radiation has been irradiated. The dosimeter may be an ionization chamber or a thermoluminescent dosimeter (TLD). Recently, a metal oxide semiconductor field effect transistor (MOSFET) dosimeter is also used to measure even a surface dose of a region of interest.

The MOSFET dosimeter is a semiconductor device, in which a radiation dose can be checked in the real time basis with an easy operation. In addition, since a plurality of MOSFET dosimeters can be attached to be used at the same time, a dose distribution can be measured at a portion where a (2-dimensional) dose distribution rapidly changes. Due to its compact and thin size, the MOSFET dosimeter can be attached on the skin surface. Thus, the dose distribution can be measured at a portion having a large curvature, such as the flank, the shoulder, the breast, and so one.

For the clinical use, preferably, characteristics of the MOSFET dosimeter are analyzed in advance. This is because, even if MOSFET dosimeters are manufactured according to the same standard through an assembly line, sensing capability is slightly different from one MOSFET dosimeter to another, and in particular, (due to its flat plane structure) an absorbed radiation dose may differ according to a radiation angle when radiation is irradiated to the MOSFET dosimeters.

As such, only when the characteristics of the MOSFET dosimeter to be used are analyzed in advance, accuracy control of a radiation treatment device can be properly performed, and a radiation dose can be accurately measured for other radiation treatments as well.

However, since the characteristic analysis on the MOSFET dosimeter has not seriously been taken into account in the past, there is no device designed for characteristic analysis.

SUMMARY

In order to solve the aforementioned problems, the present invention provides a holder device for analyzing characteristics of a dosimeter, whereby one or more dosimeters can be disposed at a desired angle and position with respect to a radiation emitter, characteristics of the dosimeters can be accurately analyzed, and thus radiation treatment and treatment schedule can be effectively performed.

According to the present invention, there is provided a holder device for analyzing characteristics of a dosimeter, in which the dosimeter is located in a desired direction on a radiation path along which radiation is irradiated from a radiation emitter, and a radiation absorbance characteristic is recognized according to a radiation dose absorbed by the dosimeter, comprising: a lower plate having a specific thickness and placed on a supporting surface facing the radiation emitter; an upper plate laminated on the upper surface of the lower plate and allowing the dosimeter to be fixedly located between the lower plate and the upper plate; and one or more height control plates disposed between the lower plate and the supporting plate so as to control the distance of the dosimeter with respect to the radiation emitter.

In the aforementioned aspect of the present invention, the dosimeter may be a metal oxide semiconductor field effect transistor (MOSFET) dosimeter, the lower plate may include a plurality of grooves extending in parallel from one fringe of the lower plate towards the center portion thereof and containing the MOSFET dosimeter therein, and the lower surface of the upper surface may be provided with a groove having space for containing the MOSFET dosimeter in addition to the grooves of the lower plate.

According to another aspect of the present invention, there is provided a holder device for analyzing characteristics of a dosimeter, in which the dosimeter is located in a desired direction on a radiation path along which radiation is irradiated from a radiation emitter, and a radiation absorbance characteristic is recognized according to a radiation dose absorbed by the dosimeter, comprising: a dosimeter holder fixedly supporting the dosimeter; a body having a partial spherical portion with a specific curvature, and having a plurality of mounting holes containing the dosimeter holder; and a supporter supporting the body so that the dosimeter is located on the radiation path.

In the aforementioned aspect of the present invention, the body may include a spherical portion having a partial spherical shape with a specific curvature, and a flat portion located at one side of the spherical portion and providing a circular plane with a specific diameter, and the mounting holes may be located at the flat portion and are arranged with a specific distance from the center of the flat portion towards the fringe of the flat portion.

In addition, the dosimeter holder may have a shape of a cylinder whose center axis is fixed to the dosimeter, the mounting holes may have specific inner diameters and extend in parallel to one another, and a scale may be formed at the fringe of the mounting hole so as to regulate an angle of the dosimeter holder inserted into the mounting hole.

In addition, the dosimeter holder may be composed of a plurality of holder pieces divided by a plane extending in a longitudinal direction, and may contain the dosimeter between the holder pieces.

In addition, in the flat portion, a scale may be marked in an equiangular manner from a center of the flat portion so that an axial line of the mounting hole can be tilted by a desired angle with respect to a horizontal plane.

In addition, the spherical portion of the body may have a reference line which is used to set an initial position of the body with respect to the radiation emitter and which is aligned to an exposure line of a laser beam externally irradiated so as to properly locate the body on the supporter.

In addition, the supporter may be a plate shape member, whose center is provided with a mounting portion to mount the body thereon, and may include a location control element to level the supporter.

In addition, the supporter may further include a horizontal gauge to check whether the supporter is leveled or not.

In addition, the supporter may be provided with one or more guide lines which are aligned to the scale formed on the flat portion of the body and by which an angle of the body is regulated.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Hereinafter, exemplary embodiments of the present invention will be described in detail with reference to the accompanying drawings.

Figure 1:
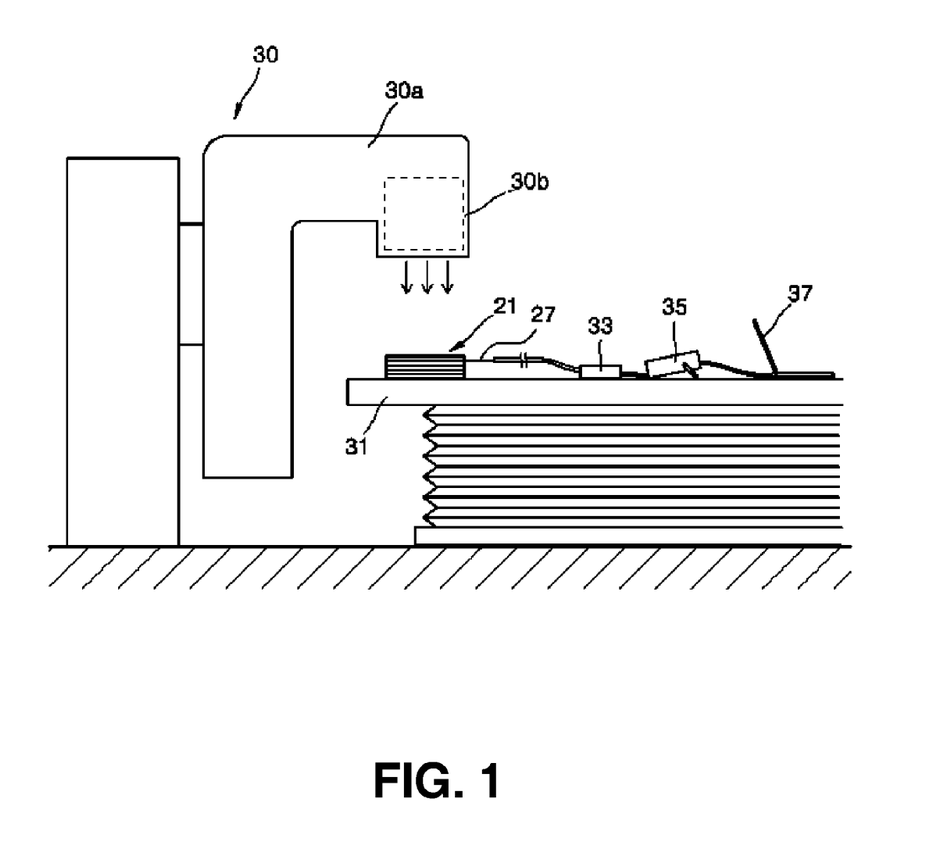
FIG. 1 illustrates a holder device for analyzing characteristics of a dosimeter according to a first embodiment of the present invention.

FIG. 1 illustrates a holder device for analyzing characteristics of a dosimeter according to a first embodiment of the present invention. The dosimeter used herein is a metal oxide semiconductor field effect transistor (MOSFET) dosimeter.

The holder device of the first embodiment has a structure simpler than that of a second embodiment to be described below. With the simple structure, a calibration factor (CF) of the dosimeter can be easily obtained when using the holder device of the first embodiment.

The CF is obtained in such a manner that an ion chamber and a MOSFET dosimeter are sequentially disposed at positions spaced apart from a radiation emitter by a predetermined distance, and then radiation is irradiated to each of the positions. As a result, a voltage is generated from the MOSFET dosimeter, and this voltage is divided by a radiation dose (reference radiation dose) measured by the use of the ion chamber. That is, CF=[voltage (mV) measured by MOSFET dosimeter/radiation dose (e.g., cGy/R/Gy) measured by ion chamber].

The CF is different from one MOSFET dosimeter to another. That is, each MOSFET dosimeter has its unique CF. Therefore, accuracy control of equipment or treatment schedule may be determined according to the CF of the MOSFET dosimeter used.

Referring to FIG. 1, a table 31 is located below a rotation gantry 30a of a linear accelerator 30. A holder device 21 is disposed on the table 31. The table 31 is a treatment bed on which a patient lies down.

The holder device 21 is located perpendicularly under a radiation emitter 30b with a MOSFET dosimeter 27 being fixedly contained therein. As a result, radiation is irradiated to the MOSFET dosimeter 27 in a vertical direction. The MOSFET dosimeter 27 is fixed to the holder device 21 and extends to be linked to a computer 37 via a connector 33 and a controller 35. In order for the computer 37 to know the CF, an electric signal is generated when radiation is irradiated to the MOSFET dosimeter 27 and is then transmitted to the computer 37 via the connecter 33 and the controller 35.

Figure 2:
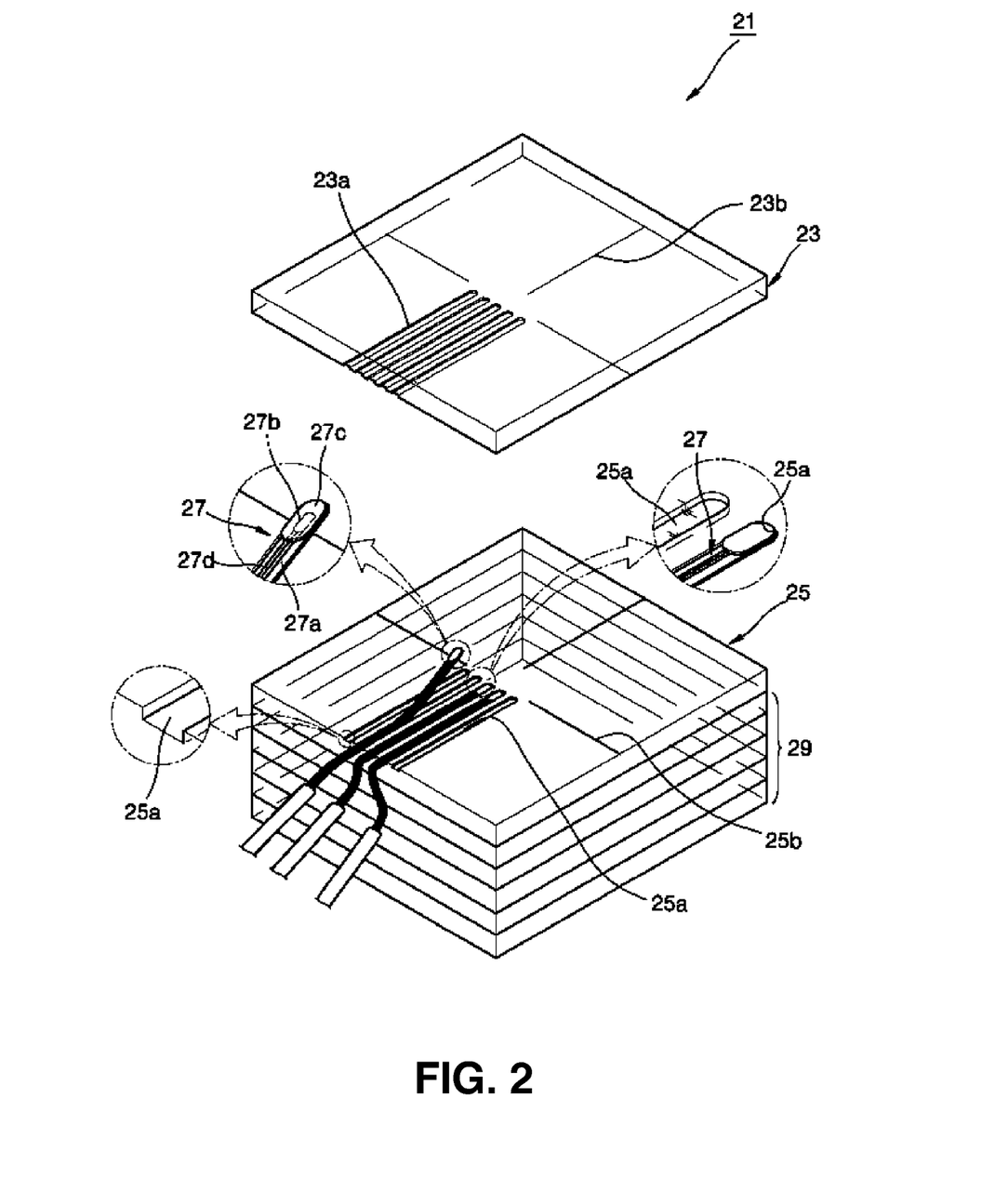
FIG. 2 is an exploded perspective view of the holder device of FIG. 1.

FIG. 2 is an exploded perspective view of the holder device 21 of FIG. 1. Referring to FIG. 2, the holder device 21 includes a plurality of height control plates 29, which are laminated on the table 31 of FIG. 1 to provide a desired height, a lower plate 25 laminated on the uppermost height control plate 29, and an upper plate 23.

Although each of the height control plates 29 has the same thickness in the figure, in practice, the height control plates 29 are constructed of a plurality of rectangular acrylic plates each having different thickness. The height control plates 29 are combined so that the lower plate 25 is positioned at a desired height.

The lower plate 25, which is laminated on the uppermost height control plate 29, is a rectangular acrylic plate whose upper surface is provided with a plurality of grooves 25a. The grooves 25a each having opening on its upper surface are arranged in parallel and extend from one fringe of the lower plate 25 towards a center portion of the lower plate 25. In the present embodiment, five grooves 25a are provided, and a front end of the center groove 25a is located at the center portion of the lower plate 25.

Three index lines 25b are located on the upper surface of the lower plate 25, and their extension lines cross at the front end of the center groove 25a. Each index line 25b is a straight line used as a reference line for regulating a width of a radiation exposure area.

The MOSFET dosimeter 27 inserted into the groove 25a will be described in brief. The MOSFET dosimeter 27 includes a substrate 27a having a predetermined thickness and extending in a longitudinal direction, a sensor 27b disposed to the front end of the substrate 27a and generating electricity in response to externally irradiated radiation, a signal transfer line 27d electrically connected to the sensor 27b and extending in a longitudinal direction of the substrate 27a with being closely attached to the substrate 27a, and an epoxy protection layer 27c covering and protecting the sensor 27b. The MOSFET dosimeter 27 having such a structure is well-known in the art.

The MOSFET dosimeter 27 is covered with the upper plate 23 with being inserted into the groove 25a of the lower plate 25.

The upper plate 23 has the same shape as the lower plate 25. The lower surface of the upper plate 23 is provided with grooves 23a. Together with the grooves 25a of the lower plate 25, each groove 23a provides space for containing the MOSFET dosimeter 27. The grooves 23a and index lines 23b formed on the lower surface of the upper plate 23 overlap the grooves 25a and the index lines 25b formed on the upper surface of the lower plate 25.

In the holder device 21 having the structure of the first embodiment, the MOSFET dosimeter 27 (whose characteristics need to be analyzed) is disposed between the lower plate 25 and the upper plate 23, and in this state, the holder device 21 is disposed to the radiation emitter 30b as shown in FIG. 1. Then, radiation is irradiated to analyze the characteristics of the MOSFET dosimeter 27.

Figure 3:
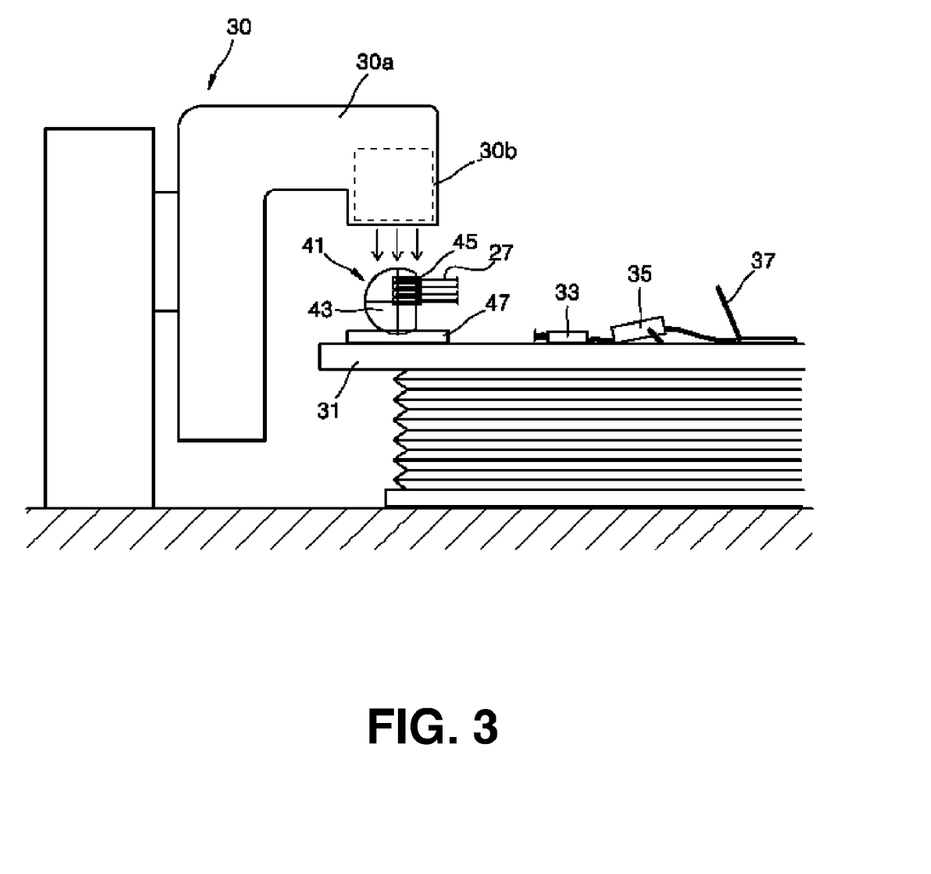
FIG. 3 illustrates a holder device for analyzing characteristics of a dosimeter according to a second embodiment of the present invention.

FIG. 3 illustrates a holder device for analyzing characteristics of a dosimeter according to a second embodiment of the present invention.

The structure of the holder device of the second embodiment is more complex than that of the first embodiment. The characteristics of a MOSTEF dosimeter to be analyzed include "dose response linearity", "energy dependence", and "angular, direction, and percent depth dose dependence".

The "dose response linearity" is examined to know whether a radiation dose measured is constant when radiation with a certain amount of energy is continuously irradiated to the MOSFET dosimeter. The "energy dependence" is examined to know whether a radiation dose measured by the MOSFET dosimeter is constant when the radiation dose increases with a predetermined time interval.

The "angular dose dependence" is examined to know a radiation dose for respective angles when radiation is irradiated to the MOSFET dosimeter at various angles. The "direction dose dependence" is examined to know a radiation dose for respective directions when an angle of the MOSFET dosimeter is regulated within a radiation path in a predetermined direction. The "percent depth dose dependence" is examined to know a value in which a radiation dose imposed on a MOSFET dosimeter fixedly located at a predetermined reference depth is divided by a radiation dose imposed on a MOSFET dosimeter located at a depth of interest.

Referring to FIG. 3, a holder device 41 of the second embodiment is located perpendicularly under a radiation emitter 30b. Radiation downwardly irradiated from the radiation emitter 30b is irradiated to a MOSFET dosimeter 27 fixed to the holder device 41. An electric signal generated from the MOSFET dosimeter 27 is delivered to a computer 37, and thus the computer 37 can analyze various characteristics of the MOSFET dosimeter 27.

The holder device 41 includes a supporter 47 placed on a table 31, a spherical holder body 43 mounted on the supporter 47, and one or more dosimeter holders 45 inserted parallel to the holder body 43 and containing the MOSFET dosimeter 27.

The MOSFET dosimeter 27 inserted into the dosimeter holder 45 is connected to the computer 37 via a connector 33 and a controller 35.

Figure 4:
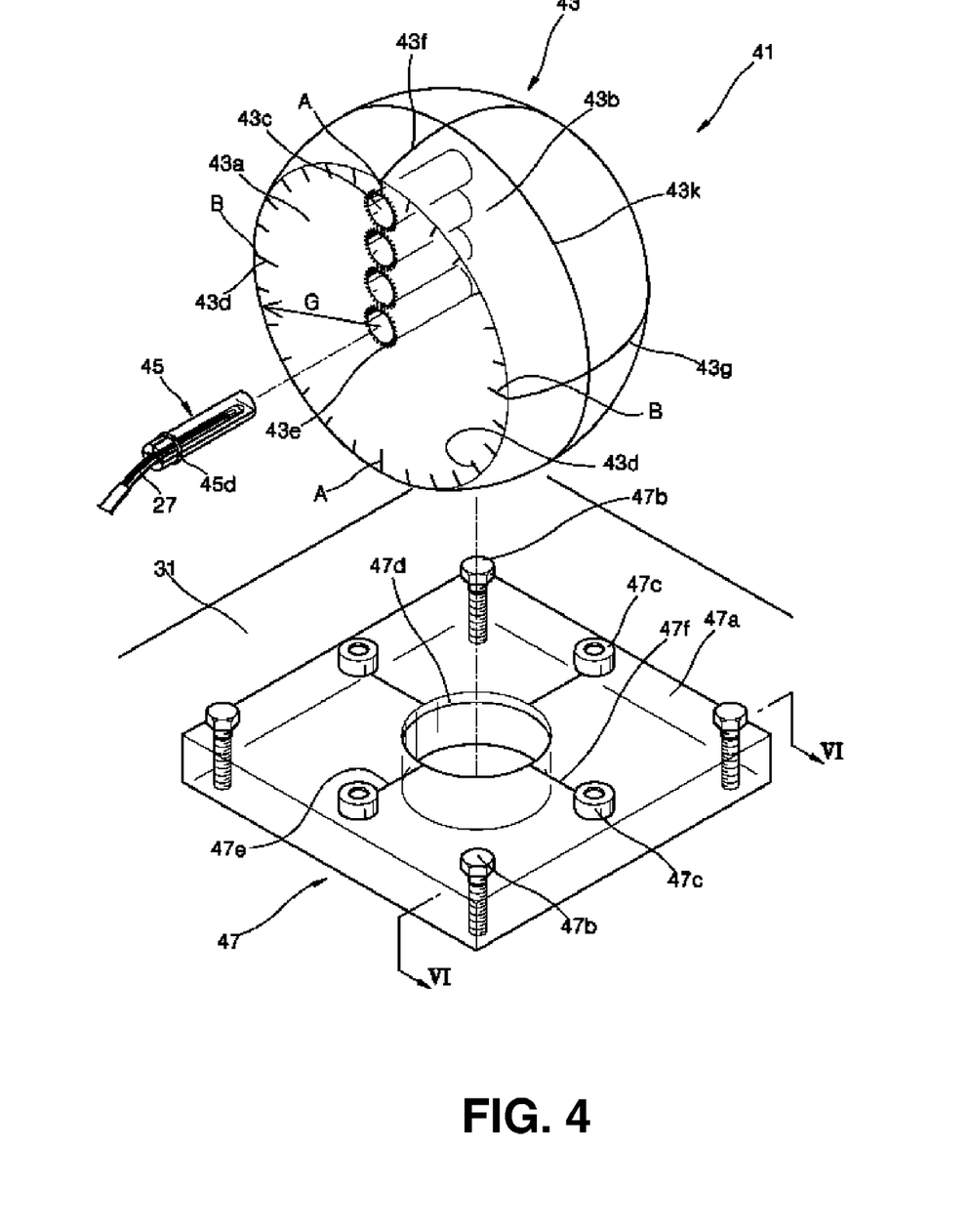
FIG. 4 is an exploded perspective view of the holder device of FIG. 3.

FIG. 4 is an exploded perspective view of the holder device 41 of FIG. 3. Referring to FIG. 4, the holder device 41 of the second embodiment has a shape of a rectangular plate and is constructed such that its center portion is provided with the supporter 47 having a mounting portion 47d, the spherical holder body 43 mounted on and supported by the mounting portion 47d of the supporter 47, and the dosimeter holder 45 inserted into the holder body 43.

The supporter 47 is made of an acrylic plate having a predetermined thickness. Further, the supporter 47 includes a supporting plate 47a having the mounting portion 47d at its center portion, horizontal control screws 47b screw-bonding to four corners of the supporting plate 47a, and a horizontal gauge 47c located on the upper surface of the supporting plate 47a and installed between the horizontal control screws 47b.

The mounting portion 47d is a through-hole having a predetermined diameter. A part of a spherical portion 43b of the holder body 43 is contained inside the mounting portion 47d so that the holder body 43 is positioned in a predetermined location.

The horizontal control screws 47b are typical acrylic bolts. The lower portion of each horizontal control screw 47b is supported by the table 31, thereby acting as a leg. The horizontal control screws 47b rotate clockwise or counterclockwise with being screw-bonded to the supporting plate 47a, and thus control the height of the supporting plate 47a with respect to the table 31. By properly adjusting the horizontal control screws 47b (even if the table 31 is tilted), the supporting plate 47a can be leveled.

Figure 6:
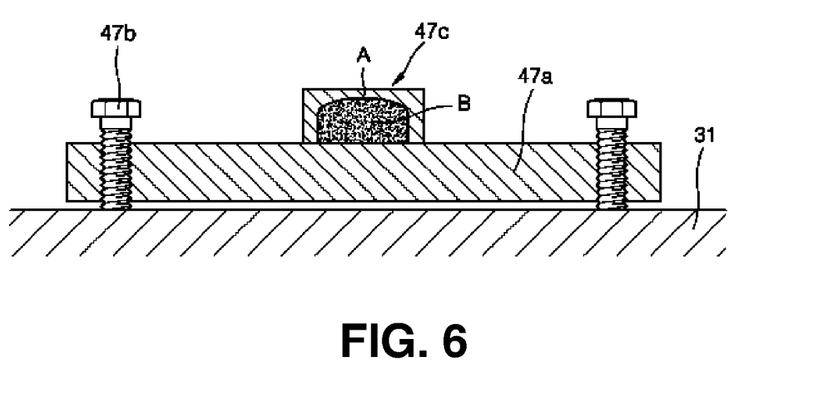
FIG. 6 is a cross-sectional view of FIG. 4, taken along a line VI-VI.

The horizontal gauge 47c, as shown in FIG. 6, includes a cylindrical casing fixed to the upper surface of the supporting plate 47a. Water (B in FIG. 6) and air (A in FIG. 6) are contained in the horizontal gauge 47c. When the supporting plate 47a is leveled, the air A is located in the middle of the upper part of the horizontal gauge 47c. Thus, the position of the air A can be used as an indication to check whether the supporting plate 47a is leveled or not. This is a typical type of horizontal gauge. By properly rotating the horizontal control screws 47b while visually checking the position of the horizontal gauge 47c, the supporting plate 47a can be leveled.

Figure 10:
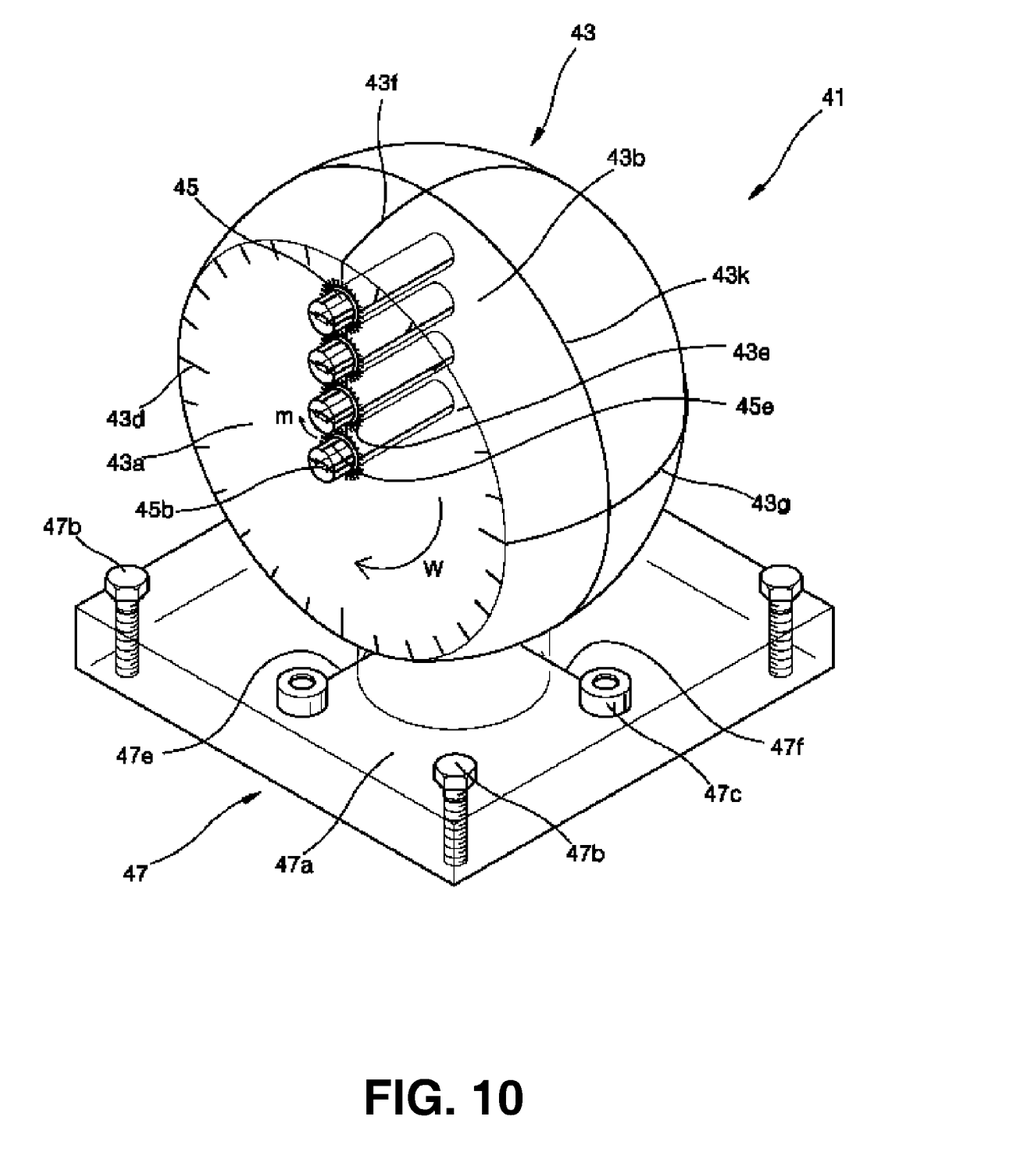
FIG. 10 is a perspective view of the holder device of FIG. 4.

Guide lines 47e and 47f are marked on the upper surface of the supporting plate 47a. The guide lines 47e and 47f extend in a cross direction with each other so that an intersection thereof is located at the center of the mounting portion 47d. As shown in FIG. 10, the guide line 47e corresponds to a reference line 43f to be described below, and the guide line 47f corresponds to a reference line 43k.

The holder body 43 is mounted on and supported by the supporter 47, and generally has a shape of a spherical member having a predetermined curvature with its one side being cut. That is, the holder body 43 includes the spherical portion 43b having a predetermined curvature and a flat portion 43a located at one portion of the spherical portion 43b and providing a flat plane. The holder body 43 is made of acrylic material and is formed in one piece. The flat portion 43a has a shape of a circle with a predetermined radius G.

Four mounting holes 43c are formed in the holder body 43. The dosimeter holders 45 are inserted through the mounting holes 43c having a predetermined diameter and parallel with each other. The four mounting holes 43c have the same diameter and are externally exposed to the flat portion 43a.

A scale 43e is marked along the fringe of each mounting hole 43c. As shown in FIG. 10, the scale 43e is read to estimate the degree of axial rotation of the dosimeter holder 45 in an arrow direction m (or its reverse direction). The scale 43e is marked in an equiangular manner from a center axis of each mounting hole 43c. For example, the scale 43e may be marked for every 15 degrees.

Figure 5:
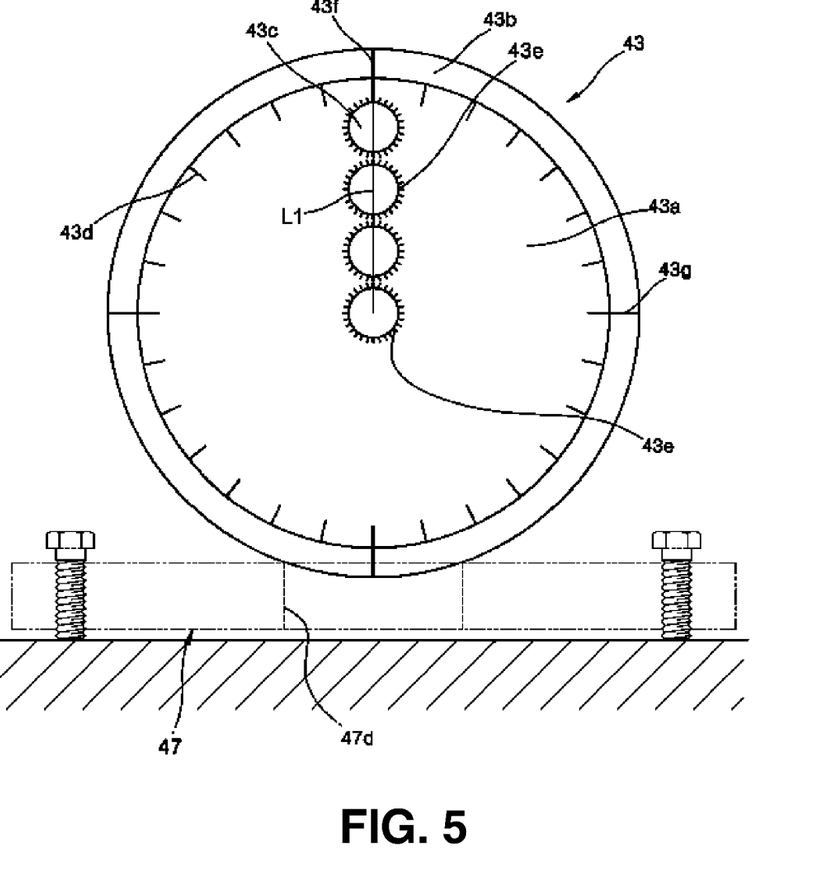
FIG. 5 is a plan view of a holder body of FIG. 4.

In particular, a center axis of one of the four mounting holes 43c is aligned to the center of the flat portion 43a, and the rest of three mounting holes 43c are aligned to a specific line (L1 in FIG. 5). The four mounting holes 43c are spaced apart with each other by the same distance.

The fringe of the flat portion 43a is also marked with a scale 43d. As shown in FIG. 10, the scale 43d is read to estimate a rotation degree, in an arrow direction w or its reverse direction, of the holder body 43 mounted on the supporter 47. The scale 43d may be marked for every 15 degrees.

The three reference lines 43f, 43g, and 43k are marked in the spherical portion 43b. In order for the holder body 43 to be properly positioned on the table 31, the three reference lines 43f, 43g, and 43k are aligned to an exposure line along which a laser beam is externally irradiated towards the holder body 43, wherein the exposure line is marked on the holder body 43. That is, the reference lines 43f, 43g, and 43k are aligned to a laser beam line marked on the outer circumferential surface of the holder body 43 when the laser beam is externally irradiated, and thus the holder body 43 is properly positioned at a predetermined location.

With respect to the scale 43d marked along the fringe of the flat portion 43, the reference line 43f is formed in a direction A which connects a point corresponding to a 12 o'clock direction and a point corresponding to a 6 o'clock direction along the spherical portion. The reference line 43g is formed in a direction B which connects a point corresponding to a 3 o'clock direction and a point corresponding to a 9 o'clock direction. The reference line 43k is perpendicular to the two reference lines 43f and 43g.

Figure 9:
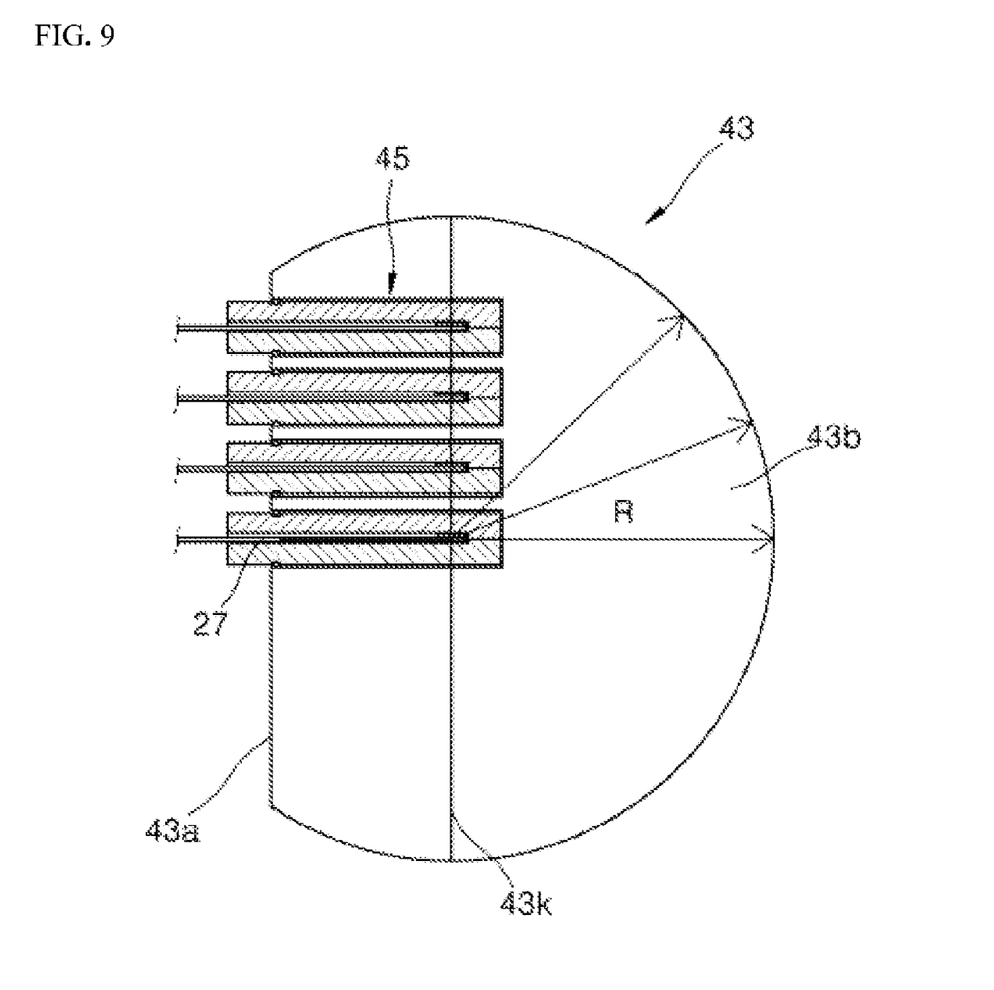
FIG. 9 is a cross-sectional view of the holder body inserted with a plurality of the dosimeter holders.

The dosimeter holder 45 is a cylindrical assembly inserted into the mounting hole 43c with the MOSFET dosimeter 27 being fixed therein. The dosimeter holder 45 brings the sensor 27b (FIG. 2) of the MOSFET dosimeter 27 to a virtual plane including the reference line 43k. That is, as shown in FIG. 9, the sensor 27b is brought to the virtual plane including the reference line 43k. The structure of the dosimeter holder 45 will be further described in detail with reference to FIG. 7.

FIG. 5 is a plan view of the holder body 43 of FIG. 4. Referring to FIG. 5, the holder body 43 is mounted on the mounting portion 47d of the supporter 47. The mounting portion 47d is a hole having a predetermined diameter and contains a part of the spherical portion 43b of the holder body 43.

The aforementioned four mounting holes 43c are located in the flat portion 43a of the holder body 43. The mounting holes 43c are aligned to one straight line L1. The line L1 is located on the same plane as the reference line 43f. The mounting holes 43c are spaced apart from each other by the same distance. For example, the mounting holes 43c may be spaced apart from each other by 2 cm.

FIG. 6 is a cross-sectional view of FIG. 4, taken along a line VI-VI. Referring to FIG. 6, one end of the supporting plate 47a is screw-bonded with the horizontal control screw 47b. As described above, the horizontal control screw 47b is an acrylic bolt, and rotates clockwise or counterclockwise with its lower portion being supported by a supporting surface (e.g., the table 31), thereby regulating the height of the supporting plate 47a with respect to the supporting surface.

The water B and the air A are contained in the horizontal gauge 47c disposed on the upper surface of the supporting plate 47a. The air A is located in the middle of the upper part of the horizontal gauge 47c when the supporting plate 47a is leveled. Thus, the position of the air A indicates whether the supporting plate 47a is leveled or not.

Figure 7:
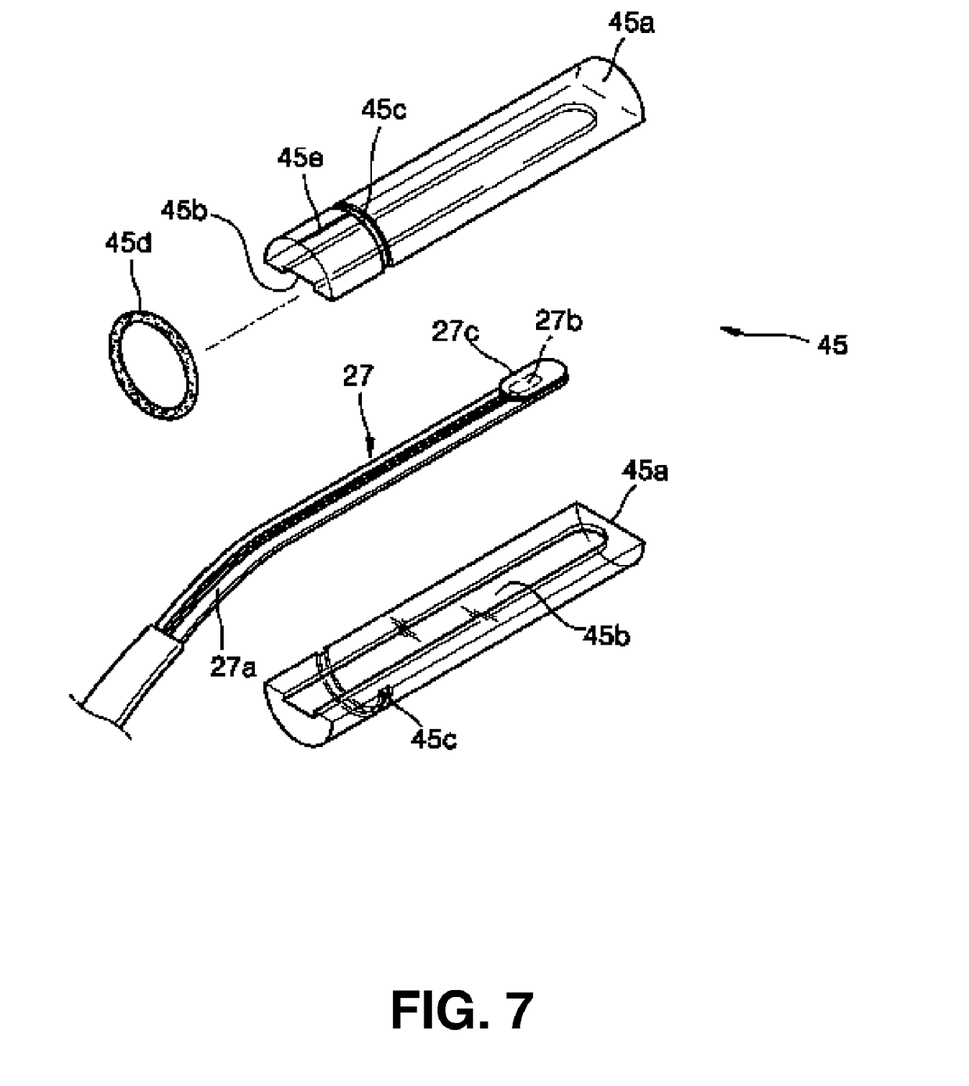
FIG. 7 is an exploded perspective view of a dosimeter holder of FIG. 4.

FIG. 7 is an exploded perspective view of the dosimeter holder 45 of FIG. 4. Referring to FIG. 7, the dosimeter holder 45 includes a pair of holder pieces 45a and an O-ring 45d binding the holder pieces 45a. Each holder piece 45a is made of an acrylic material. A dosimeter groove 45b is provided to a surface of each holder piece 45a. The dosimeter groove 45b supports the MOSFET dosimeter 27.

A ring groove 45c is formed on one outer circumferential surface of each holder piece 45a. The ring groove 45c has a ring shape when the two holder pieces 45a come in contact with each other. The O-ring 45d is contained in the ring groove 45c. The O-ring 45d is a typical rubber ring member having resilience and allows the two holder pieces 45a to be reliably in contact with each other.

An indication scale 45e is formed on the outer circumferential surface of one holder piece 45a. As shown in FIG. 10, the indication scale 45e corresponds to the scale 43e (with the dosimeter holder 45 being inserted into the mounting hole 43c). Therefore, by using a relative position of the indication scale 45e corresponding to the scale 43e, it is possible to recognize how much the dosimeter holder 45 rotates in an arrow direction (or its reverse direction).

Figure 8:
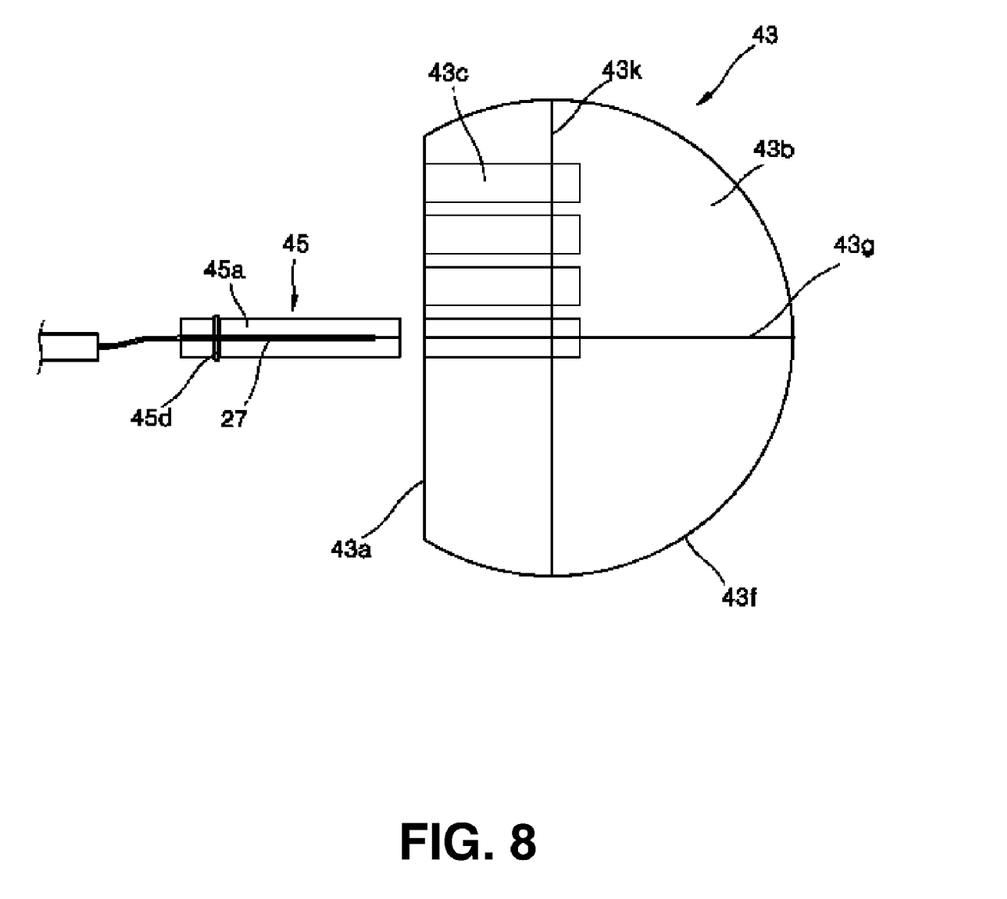
FIG. 8 is a lateral cross-sectional view of the holder body and the dosimeter holder.

FIG. 8 is a lateral cross-sectional view of the holder body 43 and the dosimeter holder 45. Referring to FIG. 8, the reference lines 43f, 43g, and 43k are perpendicularly marked in the spherical portion 43b of the holder body 43. The lowest mounting hole 43c among the four mounting holes 43c is positioned such that its center axis is located at a portion where the virtual planes including the reference lines 43f and 43g cross with each other.

The sensor 27b of the MOSFET dosimeter 27 inserted into the lowest mounting hole 43c is spaced apart from the outer circumferential surface of the spherical portion 43b by a distance (R in FIG. 9).

FIG. 9 is a cross-sectional view of the holder body 43 having a plurality of the dosimeter holders 45. Referring to FIG. 9, the dosimeter holders 45 are respectively inserted into the mounting holes 43c. Herein, the MOSFET dosimeters 27 are respectively provided to the dosimeter holders 45. Not all of the dosimeter holders 45 have to be respectively mounted on the mounting holes 43c. That is, a required number of the dosimeter holders 45 may be selectively placed at desired positions.

FIG. 10 is a perspective view of the holder device 41 of FIG. 4. The MOSFET dosimeter 27 is not depicted in FIG. 10. Referring to FIG. 10, the holder body 43 is placed above the supporter 47. In particular, the reference line 43k of the spherical portion 43b is aligned to the guide line 47f of the supporting plate 47a, and the other guide line 43f is aligned to the guide line 47e. By aligning the guide lines to the reference lines, the holder body 43 can be properly located (even if a laser beam is not used).

With being properly located, the holder body 43 can rotate by a required angle in an arrow direction W. At this time, the reference line 43k must not be deviated from the guide line 47f. That is, even after the location of the holder body 43 changes, the guide line 47f has to be aligned to the reference line 43k.

Meanwhile, the dosimeter holders 45 are respectively inserted into the mounting holes 43c. The angle of each dosimeter holder 45 can be adjusted in an arrow direction m or its reverse direction with the dosimeter holders 45 being respectively inserted into the mounting holes 43c. Thus, the MOSFET dosimeter 27 can rotate as shown in FIG. 12.

Figure 12A:
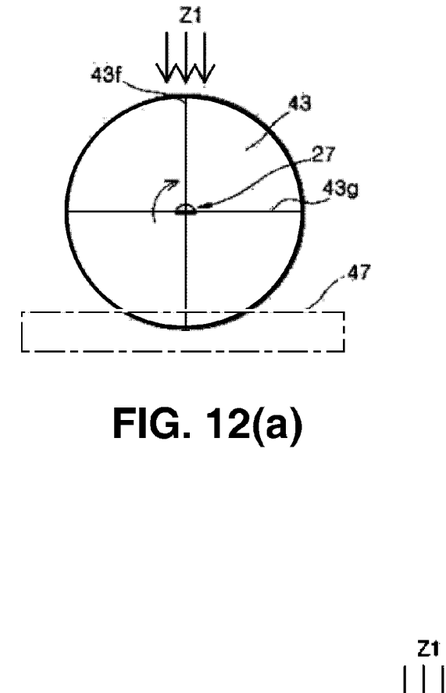
Figure 12B:
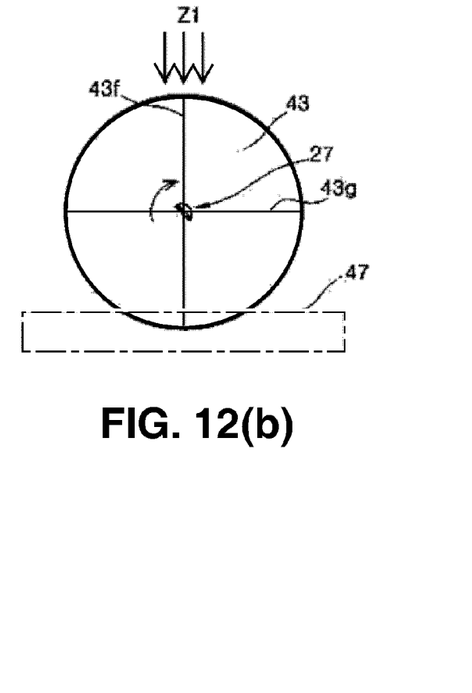
Figure 12C:
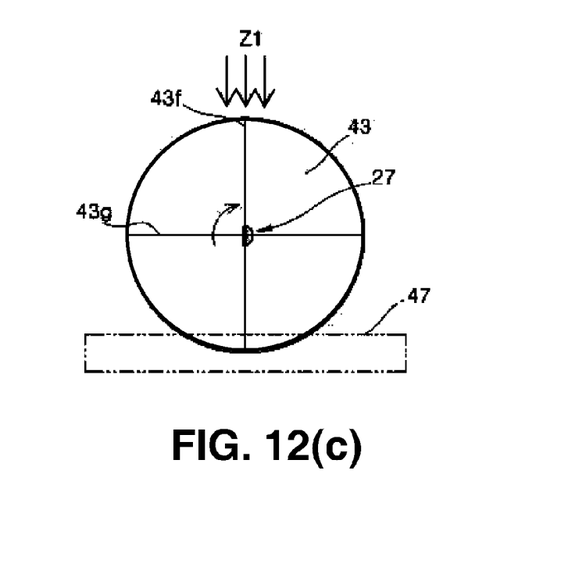
Figure 13:
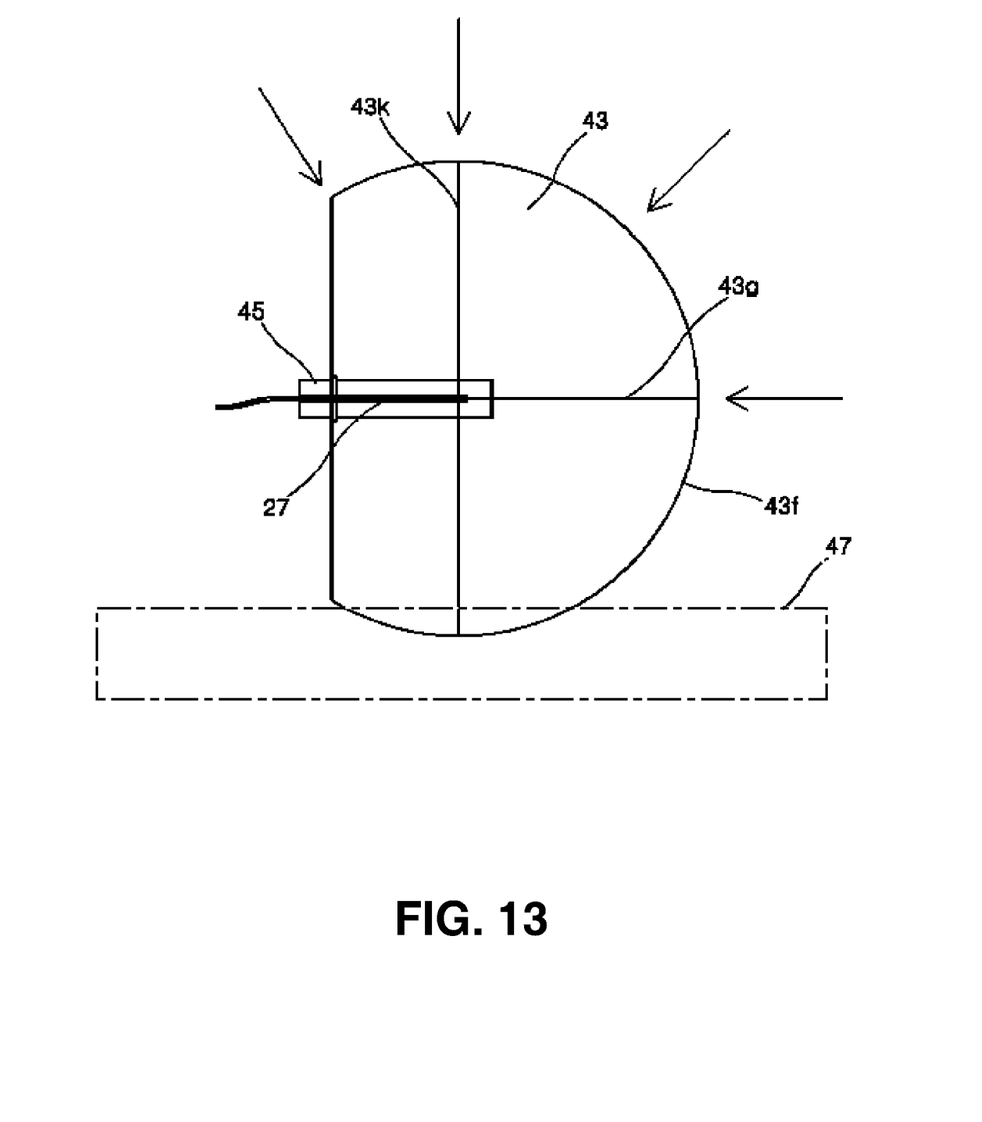

FIGS. 11 to 13 show examples when radiation is irradiated at different angles to the MOSFET dosimeters 27 by using the holder device 41, according to a second embodiment of the present invention. FIG. 11(a) to (d) shows a case where the holder body 43 mounted on the supporter 47 when the holder body 43 rotates by 45 degrees in the arrow direction W of FIG. 10. The angle of the holder body 43 can be precisely adjusted by moving the scale 43d according to the guide line 47e.

Figure 11A:
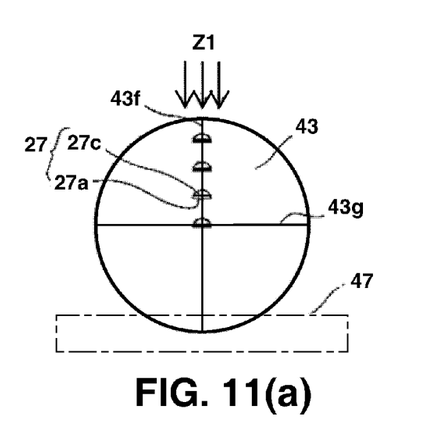
FIGS. 11 to 13 show examples when radiation is irradiated at different angles to a MOSFET dosimeter by using a holder device, according to a second embodiment of the present invention.

Referring to FIG. 11A, radiation is irradiated in a direction Z1 in a state that a plurality of the MOSFET dosimeters 27 are vertically arranged. When the radiation is irradiated to the vertically arranged MOSFET dosimeters 27, it is possible to measure the "dose response linearity", the "energy dependence", and the "percent depth dose dependence" of each MOSFET dosimeter 27.

Figure 11B:
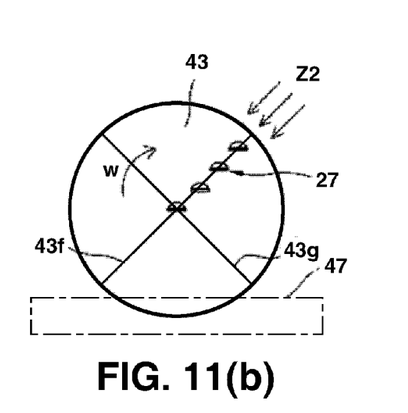

Referring to FIG. 11B, the holder body 43 rotates by 45 degrees in an arrow direction w. In this state, when the rotation gantry (30a of FIG. 3) rotates by 45 degrees and radiation is irradiated in a direction Z2, it is possible to know the "angular dose dependence" and the "percent depth dose dependence" of each MOSFET dosimeter 27.

Figure 11C:
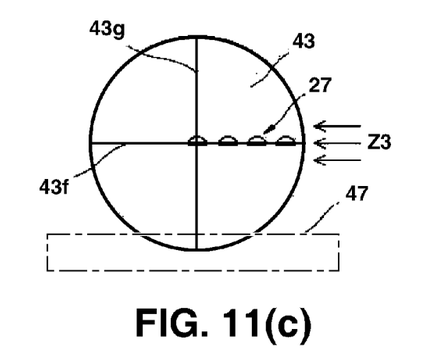

When the holder body 43 further rotates and thus the MOSFET dosimeters 27 are horizontally located as shown in FIG. 11C, and in this state, if radiation is irradiated in a direction Z3, it is possible to know the "angular dose dependence" and the "percent depth dose dependence" of each MOSFET dosimeter 27 at a different angle.

Figure 11D:
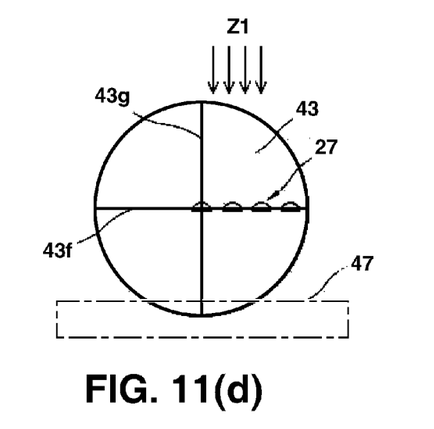

FIG. 11D shows a case where radiation is irradiated in a direction Z1 when the MOSFET dosimeters 27 are horizontally disposed and the rotation gantry is properly positioned. In this manner, it is possible to know the "dose response linearity", the "energy dependence", and the "percent depth dose dependence" of each MOSFET dosimeter 27. Further, a 2-dimensional dose distribution pattern also can be known.

FIG. 12(a) to (c) illustrates an example in which the MOSFET dosimeter 27 is mounted only in the mounting hole 43c located at the center of the flat portion 43a, and the MOSFET dosimeter 27 rotates in an axial direction within a radiation path when radiation is irradiated in a direction Z1.

Referring to FIG. 12(a) to (c), when radiation is irradiated while rotating the MOSFST dosimeter 27 located at a specific depth of the holder body 43 in an arrow direction, it is possible to know the "dose response linearity" and the "energy dependence" of the MOSFET dosimeter 27 with respect to various angles.

FIG. 13 illustrates an example in which radiation is irradiated to the MOSFET dosimeter 27 while changing a radiation angle in a state that the MOSFET dosimeter 27 is disposed only to the center mounting hole 43c as shown in FIG. 12. The radiation is irradiated to the sensor 27b of the MOSFET dosimeter 27 at various angles along the reference line 43f. Throughout this process, it is possible to know the "dose response linearity", the "energy dependence", and the "angular and direction dose dependence" of the MOSFET dosimeter 27.

Accordingly, in a holder device for analyzing characteristics of a dosimeter of the present invention, one or more dosimeters can be disposed at a desired angle and position with respect to a radiation emitter. Therefore, characteristics of the dosimeters can be accurately analyzed. As a result, the present invention is effective to radiation treatment and treatment schedule.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A holder device for analyzing characteristics of a dosimeter, in which the dosimeter is located in a desired direction on a radiation path along which radiation is irradiated from a radiation emitter, and a radiation absorbance characteristic is recognized according to a radiation dose absorbed by the dosimeter, comprising:
  a lower plate having a specific thickness and placed on a supporting surface facing the radiation emitter;
  an upper plate laminated on the upper surface of the lower plate and allowing the dosimeter to be fixedly located between the lower plate and the upper plate; and
  one or more height control plates disposed between the lower plate and the supporting plate so as to control the distance of the dosimeter with respect to the radiation emitter,
  wherein the dosimeter is a metal oxide semiconductor field effect transistor (MOSFET) dosimeter,
  the lower plate includes a plurality of grooves extending in parallel from one fringe of the lower plate towards the center portion thereof and containing the MOSFET dosimeter therein, and
  the lower surface of the upper plate is provided with a groove having space for containing the MOSFET dosimeter in addition to the grooves of the lower plate.

2. A holder device for analyzing characteristics of a dosimeter, in which the dosimeter is located in a desired direction on a radiation path along which radiation is irradiated from a radiation emitter, and a radiation absorbance characteristic is recognized according to a radiation dose absorbed by the dosimeter, comprising:
  a dosimeter holder fixedly supporting the dosimeter;
  a body having a partial spherical portion with a specific curvature, and having a plurality of mounting holes containing the dosimeter holder; and
  a supporter supporting the body so that the dosimeter is located on the radiation path,
  wherein the body includes a spherical portion having a partial spherical shape with a specific curvature, and a flat portion located at one side of the spherical portion and providing a circular plane with a specific diameter,
  the mounting holes are located at the flat portion and are arranged with a specific distance from the center of the flat portion towards the fringe of the flat portion,
  the dosimeter holder has a shape of a cylinder whose center axis is fixed to the dosimeter, and
  wherein the mounting holes have specific inner diameters and extend in parallel to one another, and a scale is formed at the fringe of the mounting hole so as to regulate an angle of the dosimeter holder inserted into the mounting hole.

3. The holder device of claim 2, wherein the dosimeter holder is composed of a plurality of holder pieces divided by a plane extending in a longitudinal direction, and contains the dosimeter between the holder pieces.

4. The holder device of claim 3, wherein, in the flat portion, a scale is marked in an equiangular manner from a center of the flat portion so that an axial line of the mounting hole can be tilted by a desired angle with respect to a horizontal plane.

5. The holder device of claim 4, wherein the supporter is provided with one or more guide lines which are aligned to the scale formed on the flat portion of the body and by which an angle of the body is regulated.

6. The holder device of claim 3, wherein the spherical portion of the body has a reference line which is used to set an initial position of the body with respect to the radiation emitter and which is aligned to an exposure line of a laser beam externally irradiated so as to properly locate the body on the supporter.

7. The holder device of claim 6, wherein the supporter further includes a horizontal gauge to check whether the supporter is leveled or not.

8. The holder device of claim 2, wherein, in the flat portion, a scale is marked in an equiangular manner from a center of the flat portion so that an axial line of the mounting hole can be tilted by a desired angle with respect to a horizontal plane.

9. The holder device of claim 8, wherein the supporter is provided with one or more guide lines which are aligned to the scale formed on the flat portion of the body and by which an angle of the body is regulated.

10. The holder device of claim 2, wherein the supporter is a plate shape member, whose center is provided with a mounting portion to mount the body thereon, and includes a location control element to level the supporter.

11. The holder device of claim 2, wherein the supporter further includes a horizontal gauge to check whether the supporter is leveled or not.

* * * * *